US006822383B2

United States Patent
Komori et al.

(10) Patent No.: US 6,822,383 B2
(45) Date of Patent: Nov. 23, 2004

(54) CRT PANEL GLASS CONTAINING SRO AND BAO

(75) Inventors: Hiroshi Komori, Otsu (JP); Hiroki Yamazaki, Koga-gun (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 0 days.

(21) Appl. No.: 09/939,897

(22) Filed: Aug. 27, 2001

(65) Prior Publication Data

US 2003/0038581 A1 Feb. 27, 2003

(51) Int. Cl.[7] .................. H01J 31/00; C03C 3/076; C03C 3/083; C03C 3/085; C03C 3/078
(52) U.S. Cl. .............. 313/480; 313/477 R; 220/2.1 A; 220/2.1 R; 501/55; 501/68; 501/69; 501/72
(58) Field of Search .................. 313/477 R, 480; 501/55, 68, 69, 72; 220/2.1 A, 2.1

(56) References Cited

U.S. PATENT DOCUMENTS

| 4,065,697 A | * | 12/1977 | Steierman ................. 313/480 |
| 4,804,885 A | * | 2/1989 | Petersen et al. ............ 313/480 |
| 6,251,811 B1 | * | 6/2001 | Yanagisawa et al. ......... 501/60 |
| 6,448,707 B1 | * | 9/2002 | Yoon et al. ................. 313/480 |

* cited by examiner

Primary Examiner—Nimeshkumar D. Patel
Assistant Examiner—Matt Hodges
(74) Attorney, Agent, or Firm—Collard & Roe, P.C.

(57) ABSTRACT

In order to suppress production of devitrifying stones such as barium disilicate and strontium silicate and to achieve a high X-ray absorbability, a CRT panel glass does not substantially contain PbO and contains, in mass percent, 9–9.5% SrO and 8.5–9% BaO. In addition, the value of SrO/(SrO+BaO) is set to 0.50–0.53. Therefore, the CRT panel glass has an X-ray absorption coefficient of 28.0 cm$^{-1}$ or more at 0.6 Å.

17 Claims, 1 Drawing Sheet

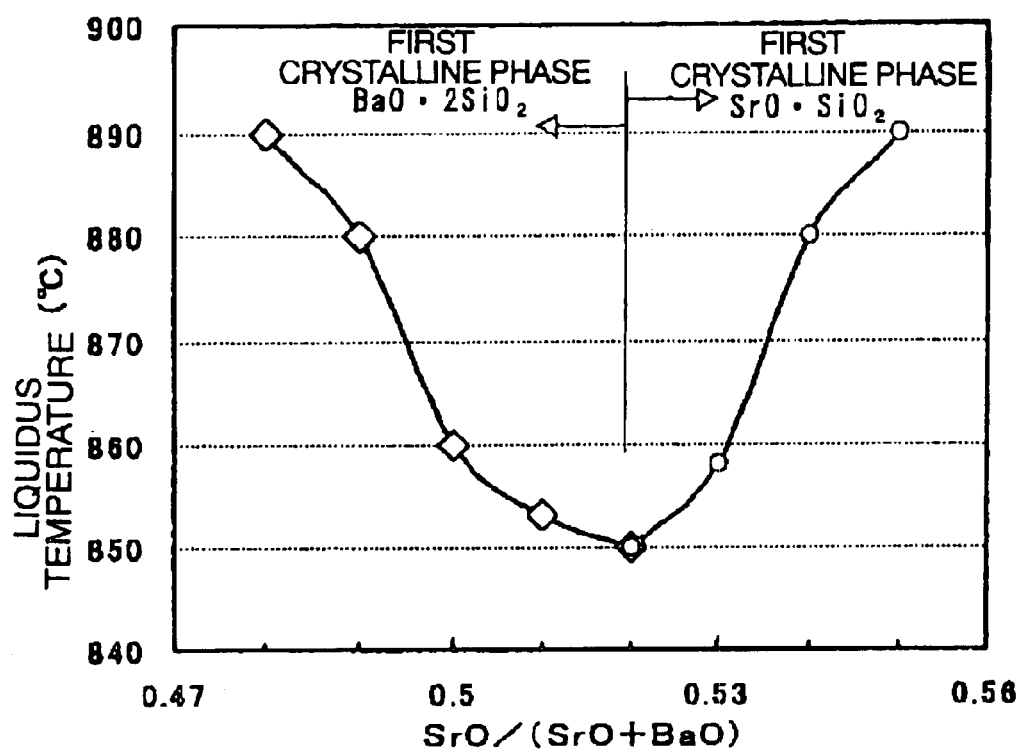

CRT PANEL GLASS CONTAINING SRO AND BAO

BACKGROUND OF THE INVENTION

The present invention relates to a CRT panel glass for use in a color-television tube.

An envelope of a CRT comprises a panel portion for projecting video images, a tubular neck portion with an electron gun arranged therein, and a flare-shaped funnel portion connecting the panel portion and the neck portion. Electron beams emitted from the electron gun excite phosphors arranged on an inner surface of the panel portion to emit light so that the video images are projected on the panel portion. At this time, X-rays bremsstrahlung are produced inside the tube. If the X rays bremsstrahlung leak out of the tube through the envelope, an adverse influence is given to the human body Therefore, the envelope of the type is required to have a high X-ray absorbability.

In order to improve an X-ray absorption coefficient of a glass, PbO may be contained in the glass. However, if the glass containing PbO is used for a panel glass, coloring called browning will occur due to irradiation of the electron beams and X-rays which are produced upon projecting the video images. This results in a problem that the images can not be seen clearly.

Therefore, in order to suppress the browning, development is made of a CRT panel which contains a large amount of SrO and BaO, instead of PbO, in the glass.

However, if the above-mentioned components are contained in the glass in a large amount, there arises a problem that devitrifying stones such as barium disilicate ($BaO \cdot 2SiO_2$) and strontium silicate ($SrO \cdot SiO_2$) are deposited in the glass and a liquidus temperature rises to make the formation of the glass difficult. In addition, the above-mentioned devitrifying stones may be produced on an image display surface of the panel glass to cause defects so that the production yield is decreased.

If the contents of SrO and BaO are decreased in order to suppress production of the devitrifying stones such as barium disilicate and strontium silicate, the X-ray absorption coefficient are decreased correspondingly.

SUMMARY OF THE INVENTION

Therefore, it is an object of the present invention to provide a CRT panel glass which has an X-ray absorption coefficient not smaller than 28.0 cm$^{-1}$ at 0.6 Å, which can lower a deposition temperature range for barium disilicate and strontium silicate, and which can prevent production of devitrifying stones thereof.

The present inventors repeatedly carried out a variety of experiments and, as a result, found a composition range which, even if a large amount of SrO and BaO are contained in order to obtain a sufficient X-ray absorbability, is capable of suppressing the increase in liquidus temperature due to presence of the devitrifying stones resulting from the above-mentioned components and propose the present invention.

According to the present invention, there is provided a CRT panel glass which does not substantially contain PbO, which contains, in mass percent, 9–9.5% SrO and 8.5–9% BaO with SrO/(SrO+BaO) being 0.50–0.53, and which has an X-ray absorption coefficient of 28.0 cm$^{-1}$ or more at 0.6 Å.

The CRT panel glass of the present invention contains a large amount of SrO and BaO and therefore has an X-ray absorption coefficient of 28.0 cm$^{-1}$ or more at a wavelength of 0.6 Å even if PbO is not contained.

Generally, in case where a large amount of SrO and BaO are contained in the glass, devitrifying stones such as barium disilicate and strontium silicate tend to be produced. This results in a rise in liquidus temperature which makes the formation of the glass difficult. In the CRT glass of the present invention, production of the above-mentioned devitrifying stones can be suppressed to lower the liquidus temperature to 860° C. or less so that formation of the glass can be facilitated by the limitation of, in mass percent, 9–9.5% SrO and 8.5–9% BaO with SrO/(SrO+BaO) being 0.50–0.53.

According to the present invention, there is also provided a CRT panel glass which does not substantially contain PbO, which contains, in mass percent, 50–70% $SiO_2$, 0–4% $Al_2O_3$, 0–4% MgO, 0–4% CaO, 9–9.5% SrO, 8.5–9% BaO, 0–2% ZnO, 5–10% $Na_2O$, 5–10% $K_2O$, 0–3% $ZrO_2$, 0–3% $TiO_2$, 0–2% $CeO_2$, 0–2% $Sb_2O_3$, and 0–2% $P_2O_5$ with SrO/(SrO+BaO) being 0.50–0.53, and which has an X-ray absorption coefficient of 28.0 cm$^{-1}$ or more at 0.6 Å.

Following is the reason for limiting the glass composition as mentioned above in the present invention.

PbO is a component which improves the X-ray absorbability of the glass. However, inclusion of PbO will cause coloring, which is called browning, by irradiation of electron beams and X-rays. Therefore, this component should not be introduced into the glass of this invention.

$SiO_2$ is a component serving as a network former of the glass. However, if the content is less than 50%, the viscosity of the glass is excessively lowered so that formation becomes difficult. The content of more than 70% leads to a coefficient of thermal expansion which is excessively low and will not match the coefficient of expansion of a funnel glass. Preferably, the content of $SiO_2$ is within the range of 53–67%.

$Al_2O_3$ is also a component serving as a network former of the glass. However, if the content is greater than 4%, the viscosity of the glass is increased so that the formation becomes difficult. Preferably, the content of $Al_2O_3$ is not greater than 3%.

MgO and CaO are components serving to facilitate melting of the glass and to adjust the coefficient of thermal expansion and the viscosity. However, if the contents are greater than 4%, the glass is easily devitrified and the liquidus temperature rises so that the formation becomes difficult. Preferably, the content of each of MgO and CaO is not greater than 2%.

SrO is a component serving to facilitate the melting of the glass, to adjust the coefficient of thermal expansion and the viscosity, and to improve the X-ray absorbability. However, if the content is greater than 9.5%, strontium silicate is produced and devitrification will easily be caused. If the content is less than 9%, barium disilicate is produced and devitrification will easily be caused, resulting in decrease in production efficiency. Preferably, the content of SrO is within the range of 9.1–9.4%.

BaO, like SrO, is also a component serving to facilitate the melting of the glass, to adjust the coefficient of thermal expansion and the viscosity, and to improve the X-ray absorbability. However, if the content is more than 9%, barium disilicate is produced and devitrification will easily be caused. If the content is less than 8.5%, strontium silicate is produced and devitrification will easily be caused, resulting in decrease in production efficiency. Preferably, the content of BaO is within the range of 8.6–8.9%.

ZnO, like SrO and BaO, is a component serving to facilitate the melting of the glass, to adjust the coefficient of thermal expansion and the viscosity, and to improve the X-ray absorbability. However, if the content is more than 2%, the glass is easily devitrified and the liquidus temperature rises so that the formation becomes difficult. Preferably, the content of ZnO is not greater than 1%.

$Na_2O$ and $K_2O$ are components to adjust the coefficient of thermal expansion and the viscosity. However if the contents are more than 10%, the viscosity is excessively low so that the formation becomes difficult and the electrical resistivity is degraded. If the contents are less than 5%, the coefficient of thermal expansion is excessively low and will not match the coefficient of expansion of the funnel glass. Preferably, the content of each of $Na_2O$ and $K_2O$ within the range of 6–9%.

$ZrO_2$ is a component to adjust the coefficient of thermal expansion and the viscosity and to improve the X-ray absorability. If the content is greater than 3%, wadcite ($K_2O.ZrO_2.3SiO_2$) is deposited and the formation becomes difficult. Preferably, the content of $ZrO_2$ is within the range of 0.1–2.5%.

$TiO_2$ is a component to suppress UV solarization of the glass. If the content is greater than 3%, the effect can not remarkably be improved and the material cost becomes high. Preferably the content of $TiO_2$ is within the range of 0.1–2%.

$CeO_2$ is a component to suppress X-ray browning of the glass. If the content is greater than 3%, the glass will be colored and the sufficient optical transmittance can not be obtained. Preferably, the content of $CeO_2$ is within the range of 0.1–2%.

$Sb_2O_3$ can be used as a fining agent. However, if the content is greater than 2%, the effect can not be remarkably be improved and the material cost becomes high. Preferably, the content of $Sb_2O_3$ is 1% or less.

$P_2O_5$ can be added to suppress the tendency of devitrification. However, if the content is greater than 2%, separation of a liquid phase occurs and, inversely, devitrification will easily be caused. Preferably, the content of $P_2O_5$ is 1% or less.

In order to suppress the deposition of barium disilicate and strontium silicte and to lower the liquids temperature, ther ration of SrO/(SrO+BaO) should be limited to 0.50–0.53. If the ratio is smaller than 0.50, barium disilicate is remarkably deposited so that the liquidus temperature dramatically rises. Furthermore, if the ratio is greater than 0.53, strontium silicate is remarkably deposited so that the liquidus temperature dramatically rises.

Besides the above-mentioned composition, a coloring agent such as CoO, NiO, and $Fe_2O_3$ may be added up to 0.3% in order to adjust the transmittance.

BRIEF DESCRIPTION OF THE DRAWINGS

FIGURE is a graph showing the relationship between SrO/(SrO+BaO) and the liquidus temperature.

DESCRIPTION OF PREFERRED EMBODIMENTS

Now, a CRT panel glass according to the present invention will be described in detail in conjunction with examples.

Table 1 shows examples according to the present invention (Samples Nos. 1 to 6) and comparative examples (Samples Nos. 7 to 8).

TABLE 1

|  | Present Invention | | | | | | Comparative Example | |
| --- | --- | --- | --- | --- | --- | --- | --- | --- |
|  | 1 | 2 | 3 | 4 | 5 | 6 | 7 | 8 |
| Composition (mass %) | | | | | | | | |
| $SiO_2$ | 61.8 | 62.4 | 61.3 | 60.6 | 61.8 | 60.3 | 61.9 | 59.5 |
| $Al_2O_3$ | 2.0 | 0.5 | 0.5 | — | 2.0 | 1.5 | 1.0 | 1.5 |
| MgO | — | 0.5 | 1.5 | — | — | 0.5 | — | 0.5 |
| CaO | — | 0.5 | — | 2.0 | — | 0.5 | 1.0 | — |
| SrO | 9.6 | 9.3 | 9.5 | 9.3 | 9.3 | 9.1 | 9.8 | 8.9 |
| BaO | 8.6 | 8.0 | 8.5 | 8.8 | 8.7 | 8.9 | 8.3 | 9.7 |
| ZnO | 0.5 | 1.0 | 0.2 | 2.0 | 0.5 | — | 2.0 | 0.1 |
| $Na_2O$ | 7.6 | 8.0 | 8.5 | 7.0 | 7.6 | 6.5 | 7.5 | 7.1 |
| $K_2O$ | 7.7 | 7.0 | 6.5 | 8.0 | 7.7 | 8.5 | 7.7 | 8.4 |
| $ZrO_2$ | 1.5 | 1.0 | 2.0 | 0.1 | 1.5 | 2.5 | 0.1 | 2.1 |
| $TiO_2$ | 0.4 | 0.2 | 0.1 | 0.3 | 0.4 | 1.1 | 0.3 | 0.5 |
| $CeO_2$ | 0.3 | 0.2 | 0.4 | 1.1 | 0.3 | 0.1 | 0.3 | 0.5 |
| $Sb_2O_3$ | 0.2 | 0.5 | 0.3 | 0.8 | 0.2 | 0.5 | 0.3 | 0.7 |
| $P_2O_2$ | — | 13 | 1.0 | — | — | — | — | 0.5 |
| SrO/(SrO + BaO) | 0.53 | 0.51 | 0.53 | 0.51 | 0.52 | 0.51 | 0.54 | 0.48 |
| Coefficient of X-ray Absorbtion (0.6 Å, $cm^{-1}$) | 29.4 | 28.8 | 29.3 | 29.4 | 28.9 | 30.3 | 20.8 | 30.1 |
| Liquidis Temperature (° C.) | 857 | 855 | 845 | 866 | 850 | 862 | 885 | 890 |

Each sample given in Table 1 was prepared in the following manner.

First, a material batch prepared to have a glass composition as defined in Table 1 was put into a platinum crucible and melted at about 1500° C., for 4 hours. In order to obtain a uniform or homogeneous glass, degassing was performed by stirring using a platinum stirring bar for three minutes in the middle of the melting process. Thereafter, the molten glass was formed into a predetermined shape and then gradually cooled.

For each sample obtained as mentioned above, the X-ray absorption coefficient and the liquidus temperature were measured. The results are shown in Table 1.

The X-ray absorption coefficient was obtained by calculating the absorption coefficient at a wavelength of 0.6 angstroms with reference to the glass composition and the density.

The liquidus temperature was measured in the following manner. First, each sample was pulverized into a size of 300–500 μm, mixed, put into a platinum boat, and transferred into a gradient heating furnace to be held at 750–1050° C. for 48 hours. Then, the platinum boat was taken out from the gradient heating furnace. Thereafter, the glass was taken out from the platinum boat. The sample thus obtained was observed by the use of a polarizing microscope to measure the crystal deposition point.

As is apparent from Table 1, each of samples Nos. 1–6 as the examples of this invention has a high X-ray absorption coefficient not smaller than 28.8 cm$^{-1}$ and has a low liquidus temperature of 857° C. or less because of the limitation within the range of 9–9.5% SrO, 8.5–9% BaO with SrO/(SrO+BaO) being 0.50–0.53.

On the other hand, the values of SrO/(SrO+BaO) in the samples Nos. 7 and 8 as the comparative examples are equal to 0.54 and 0.48, respectively. Therefore, the liquidus temperature was as high as 880° C. or more.

Next, description will be made about the relationship between SrO/(SrO+BaO) and the liquidus temperature.

By the use of the sample No. 5 as a basic composition, examination was made of the relationship between SrO/(SrO+BaO) and the liquidus temperature. The composition of each sample used in the examination was shown in Table 2.

The relationship between SrO/(SrO+BaO) and the liquidus temperature is shown in the FIGURE. In the FIGURE, an ordinate shows the liquidus temperature while an abscissa shows the ratio of SrO/(SrO+BaO). In addition, ◇ in the table and in the FIGURE represents occurrence of deposition of barium disilicate in the first crystalline phase while ○ represents occurrence of deposition of strontium silicate in the first crystalline phase.

As is apparent from Table 2 and the FIGURE, when the value of SrO/(SrO+BaO) is equal to 0.52, the first crystalline phase contains two kinds of crystals including barium disilicate and strontium silicate and the liquidus temperature exhibits the minimum value. When the value of SrO/(SrO+BaO) becomes greater than 0.52, strontium silicate is deposited in the first crystalline phase. When the value exceeds 0.53, the liquidus temperature dramatically rises. When the value of SrO/(SrO+BaO) becomes smaller than 0.52 on the contrary, barium disilicate is deposited in the first crystalline phase. When the value becomes smaller than 0.50, the liquidus temperature dramatically rises.

As described above, the glass of the present invention has the high X-ray absorption coefficient of 28.0 cm$^{-1}$ or more and is easy in melting and formation because the liquidus temperature is low. Therefore, the glass is suitable as a CRT panel glass for use in a color-television tube.

What is claimed is:

1. A CRT panel which does not substantially contain PbO, which contains, in mass percent, 9–9.5% SrO, 8.5–9% BaO, 0.1–2.5% ZrO$_2$ and 0.1–2% TiO$_2$, with SrO/(SrO–BaO) being 0.50–0.53, and which has an X-ray absorption coefficient of 28.0$^{-1}$ or more at 0.6 Å.

2. A CRT panel as claimed in claim 1, wherein the content of SrO is 9.1–9.4% in mass percent.

3. A CRT panel as claimed in claim 1, wherein the content of BaO is 8.6–8.9% in mass percent.

TABLE 2

|  | 5-1 | 5-2 | 5-3 | 5-4 | 5 | 5-5 | 5-6 | 5-7 |
|---|---|---|---|---|---|---|---|---|
| Composition (mass %) | | | | | | | | |
| SiO$_2$ | 61.8 | 61.8 | 61.8 | 61.8 | 61.8 | 61.8 | 61.8 | 61.8 |
| Al$_2$O$_3$ | 2.0 | 2.0 | 2.0 | 2.0 | 2.0 | 2.0 | 2.0 | 2.0 |
| MgO | — | — | — | — | — | — | — | — |
| CaO | — | — | — | — | — | — | — | — |
| SrO | 8.7 | 8.8 | 9.0 | 9.2 | 9.3 | 9.5 | 9.7 | 9.9 |
| BaO | 9.3 | 9.2 | 9.0 | 8.8 | 8.7 | 8.5 | 8.3 | 8.1 |
| ZnO | 0.5 | 0.5 | 0.5 | 0.5 | 0.5 | 0.5 | 0.5 | 0.5 |
| Na$_2$O | 7.6 | 7.6 | 7.6 | 7.6 | 7.6 | 7.6 | 7.6 | 7.6 |
| K$_2$O | 7.7 | 7.7 | 7.7 | 7.7 | 7.7 | 7.7 | 7.7 | 7.7 |
| ZrO$_2$ | 1.5 | 1.5 | 1.5 | 1.5 | 1.5 | 1.5 | 1.5 | 1.5 |
| TiO$_2$ | 0.4 | 0.4 | 0.4 | 0.4 | 0.4 | 0.4 | 0.4 | 0.4 |
| CeO$_2$ | 0.3 | 0.3 | 0.3 | 0.3 | 0.3 | 0.3 | 0.3 | 0.3 |
| Sb$_2$O$_3$ | 0.2 | 0.2 | 0.2 | 0.2 | 0.2 | 0.2 | 0.2 | 0.2 |
| P$_2$O$_5$ | — | — | — | — | — | — | — | — |
| SrO/(SrO + BaO) | 0.48 | 0.49 | 0.50 | 0.51 | 0.52 | 0.53 | 0.54 | 0.55 |
| Liquidus Temperature (° C.) | 890 | 880 | 860 | 853 | 850 | 859 | 880 | 890 |
| 1st Crystalline Phase | ◇ | ◇ | ◇ | ◇ | ◇○ | ○ | ○ | ○ |

Each sample was prepared in the above-mentioned manner to obtain the liquidus temperature and a first crystalline phase of deposited crystals. It is noted here that the liquidus temperature was measured in the above-mentioned manner while the first crystalline phase was identified by observing the deposited crystals by the use of the polarizing microscope.

4. A CRT panel which does not substantially contain PbO, which contains, in mass percent, 50–70% SiO$_2$, 0–4% Al$_2$O$_3$, 0–4% MgO, 0–4% CaO, 9–9.5% SrO, 8.5–9% BaO, 0–2% ZnO, 5–10% Na$_2$O, 5–10% K$_2$O, 0.1–2.5% ZrO$_2$, 0.1–2% TiO$_2$, 0–2% CeO$_2$, 0–2% Sb$_2$O$_3$, and 0–2% P$_2$O$_5$, with SrO/(SrO+BaO) being 0.50–0.53, and which has an X-ray absorption coefficient of 28.0 cm$_{-1}$ or more at 0.6 Å.

5. A CRT panel as claimed in claim 4, wherein the content of $SiO_2$ is 53–67% in mass percent.

6. A CRT panel as claimed in claim 4, wherein the content of $Al_2O_3$ is 3% or less in mass percent.

7. A CRT panel as claimed in claim 4, wherein the content of MgO is 2% or less in mass percent.

8. A CRT panel as claimed in claim 4, wherein the content of CaO is 2% or less in mass percent.

9. A CRT panel as claimed in claim 4, wherein the content of SrO is 9.1–9.4% in mass percent.

10. A CRT panel as claimed in claim 4, wherein the content of BaO is 8.6–8.9% in mass percent.

11. A CRT panel as claimed in claim 4, wherein the content of ZnO is 1% or less in mass percent.

12. A CRT panel as claimed in claim 4, wherein the content of $Na_2O$ is 6–9% in mass percent.

13. A CRT panel as claimed in claim 4, wherein the content of $K_2O$ is 6–9% in mass percent.

14. A CRT panel as claimed in claim 4, wherein the content of $CeO_2$ is 0.1–2% in mass percent.

15. A CRT panel as claimed in claim 4, wherein the content of $Sb_2O_3$ is 1% or less in mass percent.

16. A CRT panel as claimed in claim 4, wherein the content of $P_2O_5$ is 1% or less in mass percent.

17. A CRT panel as claimed in claim 4, wherein the coloring agent is added up to 0.3% in mass percent.

* * * * *